United States Patent [19]

Shutterly

[11] 4,065,794
[45] Dec. 27, 1977

[54] PLAYBACK TECHNIQUE FOR AN AUDIO-VIDEO PROGRAM WHEREIN THE VIDEO DISPLAY IS CONTROLLED BY SIGNALS RECORDED AS A PART OF THE AUDIO PROGRAM

[75] Inventor: Harold B. Shutterly, Edgewood Boro., Pa.

[73] Assignee: Westinghouse Electric Corporation, Pittsburgh, Pa.

[21] Appl. No.: 637,552

[22] Filed: Dec. 4, 1975

[51] Int. Cl.² .................... H04N 5/785; G11B 27/30
[52] U.S. Cl. ........................................ 360/10; 360/8; 360/9; 360/19; 360/32; 360/35; 360/72
[58] Field of Search ...................................... 360/8–10, 360/18–19, 24, 32, 33, 35, 72; 179/15.55 T; 358/127

[56] References Cited

U.S. PATENT DOCUMENTS

| | | | |
|---|---|---|---|
| 3,085,130 | 4/1963 | Lemelson | 360/9 |
| 3,715,481 | 2/1973 | Harr | 360/10 |
| 3,789,137 | 1/1974 | Newell | 360/8 |
| 3,872,503 | 3/1975 | Shutterly | 360/8 |
| 3,878,560 | 4/1975 | Ramage | 360/8 |
| 3,909,512 | 9/1975 | Omori et al. | 360/8 |
| 3,922,715 | 11/1975 | Hirashima | 360/9 |
| 3,934,268 | 1/1976 | Uemura | 360/10 |
| 3,938,189 | 2/1976 | Goldmark | 360/8 |

OTHER PUBLICATIONS

Frost et al., Video Recorder with Multiplex Audio, IBM Tech. Disc. Bull. vol. 11, No. 7, 12/68 p. 793.

Primary Examiner—Raymond F. Cardillo, Jr.
Attorney, Agent, or Firm—M. P. Lynch

[57] ABSTRACT

In an audio-video program consisting of time compressed segments of audio information in the format of TV lines and video change signals associated with one or more of the audio segments, and video information to be displayed in response to the video change signals stored in separate portions of a magnetic or video storage medium, the playback of video information is synchronized to the playback of audio information by the occurrence of the video change signals present in the recorded audio information.

9 Claims, 7 Drawing Figures

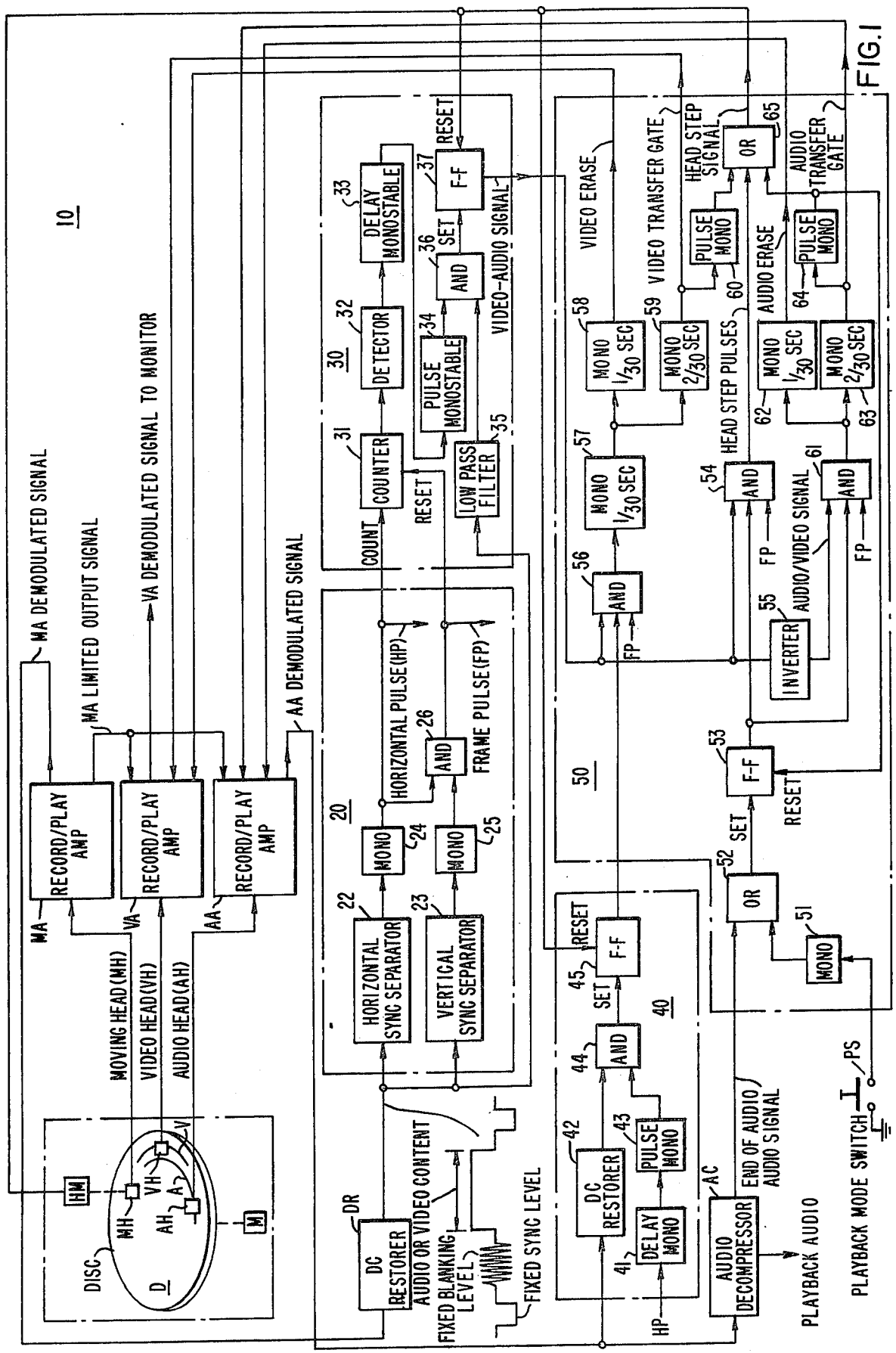

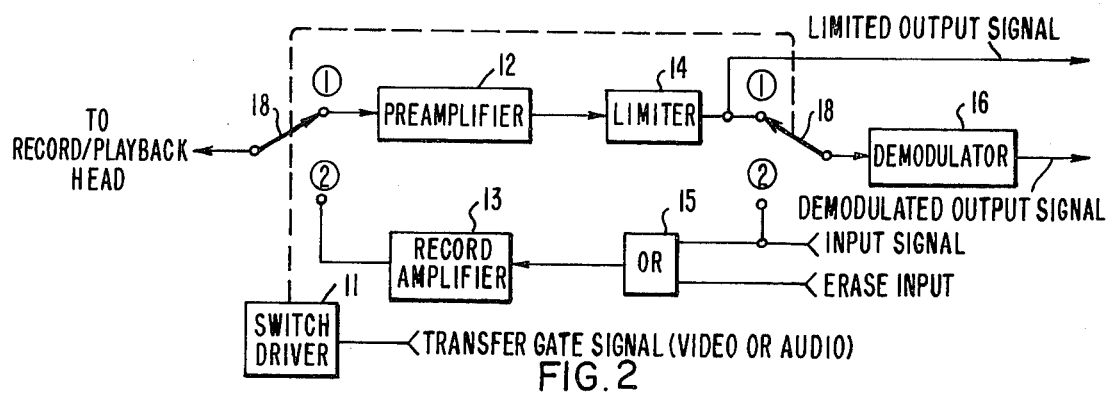
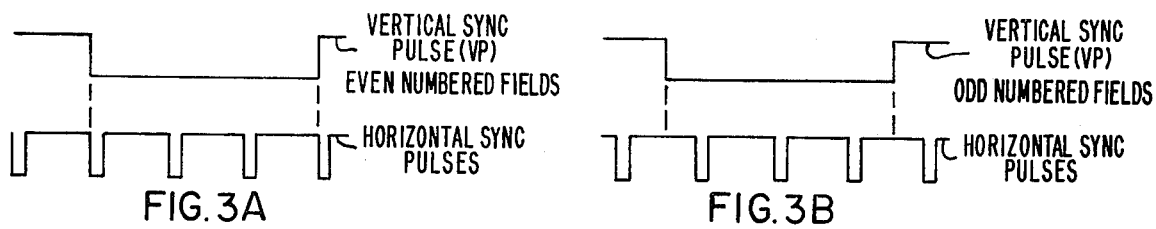
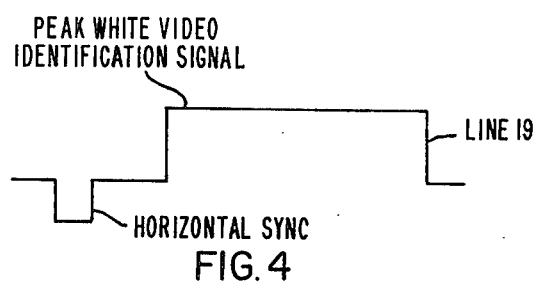
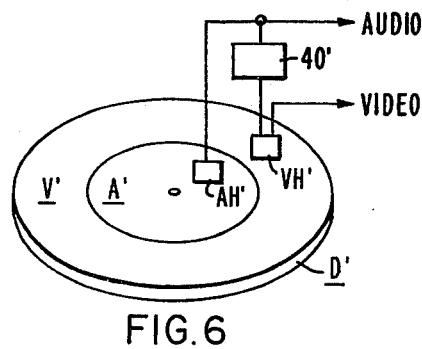
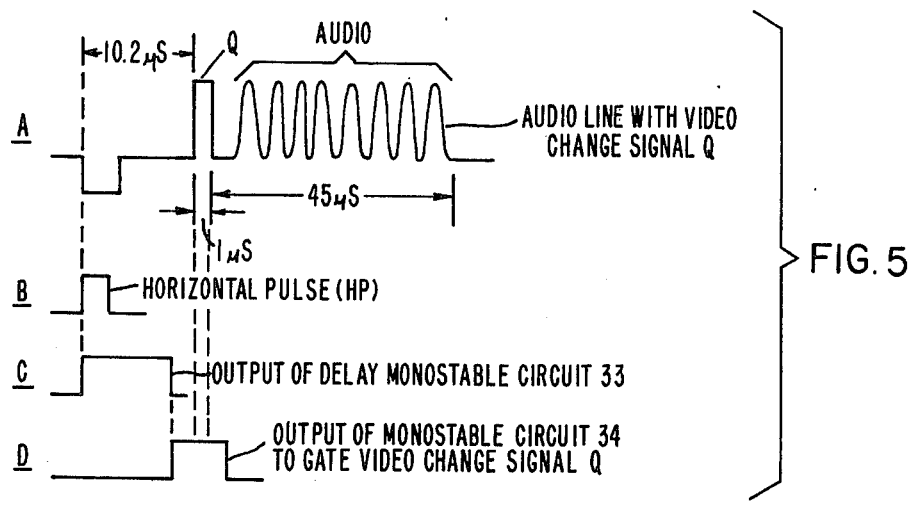

PLAYBACK TECHNIQUE FOR AN AUDIO-VIDEO PROGRAM WHEREIN THE VIDEO DISPLAY IS CONTROLLED BY SIGNALS RECORDED AS A PART OF THE AUDIO PROGRAM

CROSS-REFERENCE TO RELATED APPLICATION

This application is closely related to the applicant's co-filed, copending patent application Ser. No. 637,551, filed Dec. 4, 1975, entitled IMPROVED RECORDING TECHNIQUE FOR VIDEO AND TIME COMPRESSED AUDIO SIGNALS, which is assigned to the assignee of the present invention.

BACKGROUND OF THE INVENTION

The time compression of audio information into video bandwidth information and the further processing of the time compressed information into pseudo video information of a format comparable to a television line is disclosed in U.S. Pat. No. 3,789,137, issued Jan. 29, 1974, assigned to the assignee of the present invention and incorporated herein by reference. This technique permits video transmission of many minutes of audio information in a few seconds. In this system, a single frame or field of video information is recorded on a separate recording track of a magnetic medium via a single moving head immediately prior to the recording of the accompanying audio information. In this system, each video frame is displayed for the period of time necessary to play back the audio track immediately following it and as such does not provide for changes in displayed video information during the playback of an audio track.

A suitable technique for achieving the recording of audio and video tracks is described in U.S. Pat. No. 3,878,560, issued Apr. 15, 1974 and assigned to the assignee of the present invention.

There is disclosed in the above-identified copending related application, Ser. No. 637,551, an improved audio-video program recording technique which provides for the interleaved recording of video (single frames or fields) and audio fields or frames, in which time compressed audio segments or audio lines are recorded on separate sections or tracks of a storage medium, such as a video or magnetic storage media leaving blank sections or tracks for the later insertion of associated video information in response to video change signals inserted in one or more of the audio lines. The term audio lines refers to the time compressed audio lines developed in accordance with the teachings of U.S. Pat. No. 3,789,137 wherein each audio segments is comparable to a television line.

The video change signals recorded in selected audio lines control the video displayed in conjunction with the audio information during playback of the audio-video program.

SUMMARY OF THE INVENTION

There is disclosed herein with reference to the accompanying drawings a technique for reproducing the time compressed segments of audio information and video information stored in accordance with the teachings of the above-identified cross-referenced related application. In the particular embodiment chosen to illustrate the invention a single general purpose moving head transfers recorded audio signals to an auxiliary audio track and recorded video signals to an auxiliary video track and fixed heads associated with the auxiliary audio track and auxiliary video track transmit the audio and video signals to signal processing and reproduction equipment. Assuming that in the single moving head embodiment the moving head initially contacts a track of time compressed audio information, the time compressed audio information is transferred to the auxiliary audio track for conversion back to normal real time audio information for reproduction of playback on conventional audio apparatus. During this conversion of the time compressed audio information, the moving head steps forward onto what will be assumed to be a video track and upon receiving a video change signal from the transferred audio information, the moving head will transfer the video signal to the auxiliary video track for direct display on a monitor. After the transfer of the video signal, the moving head again steps onto the next track which, for the purposes of discussion, is assumed to be another video track. When a second video change signal is received from the transferred audio information, the next recorded video signal will be transferred to the auxiliary video track. This process will continue until the video information associated with the video change signals recorded with the transferred audio information have been transferred to the auxiliary video track for display on the monitor. After the last transfer of video information dictated by the video change signals of the transferred audio track is completed, the moving head steps forward onto the next recorded audio track and is in a position to transfer the recorded audio information to the auxiliary audio track for conversion when the conversion of the previously transferred recorded audio information is completed.

To avoid any discontinuity in the recorded audio during transfer of the audio to the audio auxiliary track, i.e., such as due to erasure and recording time, the conversion of the time compressed audio to real time audio can begin from the signal initially derived from the moving head and continue from the signal derived from the fixed head associated with the audio auxiliary track after the transfer is completed. An animated pictorial presentation can be displayed on a monitor by providing an appropriate number of video change signals in combination with the segments of recorded time compressed audio information to produce a rapid change of the displayed picture information. Further, signals can be provided to reverse the display of a series of pictures as well as repeat pictures a number of times.

Real time video, i.e., television, wherein a new picture is displayed every 1/30th of a second, can be provided by displaying the video output signal derived by the moving head directly onto the monitor without transferring the video information to the video auxiliary track.

While the embodiment chosen for discussing the invention utilizes a single moving head and fixed audio and video heads associated with auxiliary audio and video storage sections or tracks on a common storage medium, the inventive concept may be implemented through numerous variations of storage media and pickup heads. Included in these variations would be the storage of the audio and video in separate sections of the storage medium and the use of a moving head associated with the recorded audio information and a moving head associated with recorded video information which would eliminate the need for the auxiliary audio and video storage sections as well as the fixed record/-playback heads associated with the auxiliary audio and video sections. In this implementation of the invention, the detection of a video change signal by the moving audio head would cause the moving video head to advance to the corresponding video information for simultaneous playback of the corresponding video information and each subsequent video change signal detected by the moving audio head would cause the moving video head to advance to and playback the associated video information.

A variation on the implementation disclosed in detail herein would involve the use of storage media for the auxiliary audio and video sections which is separate and apart from the main sequential access storage medium, disc D.

It is further apparent, that either the single moving head implementation or the dual moving head implementation can be satisfied through the use of either a magnetic storage medium or an optical storage medium recognizing that the former medium would utilize magnetic record/playback heads while the optical recording media would employ optical heads.

DESCRIPTION OF THE DRAWINGS

The invention will become more readily apparent from the following exemplary description in connection with the accompanying drawings:

FIG. 1 is a block diagram illustration of an audio-video program playback system embodying the invention;

FIG. 2 is a block diagram schematic of a record/-playback amplifier used in the embodiment of FIG. 1;

FIGS. 3A, 3B, 4 and 5 are pulse graph representations of the operation of the embodiment of FIG. 1; and FIG. 6 is an alternate embodiment of the storage medium and record/playback heads of FIG. 1.

DESCRIPTION OF THE PREFERRED EMBODIMENT

Referring to FIG. 1, there is illustrated in block diagram form, a playback system 10 which is designed to provide a continuous audio output signal accompanied by displayed video wherein changes in the displayed video occur at arbitrary points in the playback of the audio-video program as determined by video change signals recorded in the audio program in accordance with the audio-video recording technique disclosed in the referenced related copending patent application Ser. No. 637,551.

The audio-video program is recorded in accordance with the technique disclosed in the above-referenced copending application on a magnetic disc D which is driven at 30 revolutions per second by the motor M. The audio-video program is played back by moving head MH which is stepped from track to track of the disc D by the head stepping motor HM. In addition to the moving head MH, there is a fixed audio playback head AH and a fixed video playback head VH for playback of the time compressed audio segments and video signals transferred to the auxiliary audio track A and auxiliary video track respectively from the moving head MH. The tracks A and V represent one technique for providing auxiliary storage buffers with repetitive readout capability. Head stepping motor HM responds to head step input signals by sequentially stepping the moving head MH through the tracks of the recorded audio-video program for transferring the recorded time compressed audio signals and recorded video signals through the moving head record/playback amplifier MA and either the video record/playback amplifier VA or the audio record/playback amplifier AA for recording on the auxiliary audio track A and video track V as described above. In the playback mode, the video head VH transfers the video information present on the video auxiliary track V through the video record/playback amplifier VA for display on a remote monitor. The audio head AH transfers the recorded time compressed information present on the audio auxiliary track A through the audio record/playback amplifier AA to a decompressor or time expansion circuit for conversion of the time compressed audio information into real time audio information for reproduction on audio apparatus such as a speaker or a headset.

A typical embodiment of a suitable record/playback amplifier to satisfy the operational requirements record/playback amplifiers MA, VA and AA is schematically illustrated in FIG. 2. The record/playback amplifier is schematically illustrated as consisting of a double pole-double throw type switch 18 which connects the amplifier to the record/playback heads MH, VH and AH. The switch 18 is illustrated as consisting of positions 1 and 2. When it is desired to operate in the playback mode, the switch 18 is located in position 1 while operation in the record mode requires switch 18 to be in position 2. Inasmuch as the moving head MH operates solely in the playback mode to transfer the recorded information to the auxiliary tracks V and A, the switch 18 associated with the record/playback amplifier MH will remain in position 1. Inasmuch as record/playback heads VH and AH are required to operate both in the record and playback mode, the switch 18 associated with the record/playback amplifiers VH and AH responds to a switch driver circuit 11 to transfer between positions 1 and 2 as will be discussed below.

In the playback mode, with switch 18 in position 1, a signal from the respective record/playback head associated with disc D passes through preamplifier 12 and the limiter circuit 14 and is supplied to a demodulator circuit 16 which demodulates the FM signal from the disc D. The outputs from the limiter circuit 14 as well as the outputs from the demodulator 16 are supplied as external output signals. In the record mode, with the switch 18 in position 2, OR gate 15 functions to transmit either an audio or video input signal or an erase input signal through the record amplifier 13 for recording by either the audio head AH or the video head VH on the appropriate auxiliary track of disc D. A positive signal applied to the erase input of OR gate 15 produces a continuous DC signal which when applied to the record amplifier 13 to either the audio head AH or the video head VH functions to erase the associated auxiliary track. The information input signal supplied to the OR gate 15 corresponds to the limited output signal developed at the output of the amplitude limiter circuit 14 of the playback channel as is illustrated in FIG. 1. The control circuitry associated with the moving head MH and the record/playback amplifiers MA, VA and AA are illustrated in FIG. 1 as consisting of FRAME AND HORIZONTAL PULSE GENERATOR CIRCUIT 20, VIDEO/AUDIO SIGNAL DISCRIMINATOR CIRCUIT 30, VIDEO CHANGE SIGNAL DETECTOR CIRCUIT 40 AND VIDEO AND AUDIO TRANSFER AND PROGRAM HEAD STEP CONTROL CIRCUIT 50.

FRAME AND HORIZONTAL PULSE GENERATOR CIRCUIT 20

The demodulated output signal from the record/playback amplifier MA associated with the moving head MH is transmitted through the DC restorer circuit DR the output of which is supplied as an input signal to horizontal sync separator 22 and vertical sync separator 23. The DC restorer circuit DR is a conventional TV circuit which maintains the sync and blanking level of each TV line at fixed voltage levels independent of the audio or video content.

The horizontal sync separator 22 and the vertical sync separator 23 are likewise conventional TV circuits. The horizontal sync separator 22 detects the voltage level of the horizontal sync pulse and the vertical sync pulses in response to voltage level and pulse duration. The output of the horizontal sync separator circuit 22 is supplied to a monostable circuit 24 which in turn develops a horizontal output pulse HP. The output of the vertical sync separator circuit 23 triggers monostable circuit 25 which develops a vertical output pulse VP. The horizontal output pulse HP from monostable circuit 24 and the vertical output pulse VP from monostable circuit 25 are applied to AND gate circuit 26 resulting in the development of a frame pulse FP output from AND gate 26. The horizontal pulse HP and frame pulse FP function as basic control signals for the remainder of the control circuitry.

The timing involved in generating the frame pulse FP is illustrated in a pulse graph waveform of FIG. 3A. The vertical sync pulse as it occurs in even number fields is illustrated in FIG. 3A and as illustrated, it is apparent that the horizontal sync pulses of FIG. 3A coincide with the leading edge of the vertical sync pulse VP in the even numbered fields. The pulse graph illustrations of FIG. 3B shows the relationship between the vertical sync pulse VP and the horizontal sync pulses in odd numbered fields. It can be seen that the horizontal sync pulses do not coincide with the leading edge of the vertical sync pulse VP in the odd numbered fields. As a consequence, when the horizontal pulse HP and the vertical pulse VP are supplied to AND gate 26, an output from AND gate 26 is produced only during even number fields and this yields a frame pulse FP rate of 30 pulses per second.

VIDEO/AUDIO SIGNAL DISCRIMINATOR CIRCUIT 30

The counter circuit 31 receives the horizontal pulses HP as a count input and the frame pulses FP as a reset pulse. Thus the counter 31 counts the lines in each frame starting from the beginning of each even numbered field. When the count reaches that of the first active line of the field, which, for the sake of discussion will assume to be line 19, the detector circuit 32 is actuated and functions to trigger the delay monostable circuit 33. The detector circuit 32 can be considered to be an AND gate which responds to the outputs from counter 31 corresponding to a count of 19 by transmitting a signal to the delay monostable circuit 33. The delay monostable circuit 33 in turn delays the output pulse transmitted by pulse monostable circuit 34 to AND gate 36 for a time sufficient to assure that the pulse from circuit 34 coincides in time with the video identification signal (FIG. 4) input to AND gate 36, when such a signal exists.

The output pulse from the delay monostable circuit 33 triggers the pulse monostable circuit 34 which supplies an input pulse to the AND gate 36. A second input to the AND gate 36 corresponds to the output of the DC restorer circuit DR after passing through the low pass filter circuit 35. The low pass filter circuit 35 removes high frequency noise from the input signal to AND gate 36 in order to prevent false identification of an audio frame as a video frame. When a frame of the program signal represented by the demodulated output signal of record/playback amplifier MA is video, the line herein assumed to be line 19 corresponds to the waveform illustration of FIG. 4. This signal consists of a peak white video identification signal throughout most of the active portion of the line. When this signal is present on line 19, the output of low pass filter 35 functions to gate the pulse output of pulse monostable circuit 34 through the AND gate 36 to the set input of flip-flop circuit 37. However, if the program information supplied to the DC restorer circuit DR by the record/playback amplifier MA corresponds to audio, the line 19 is at the blanking level and the output pulse from pulse monostable circuit 34 is not gated through AND gate 36 to the set input of flip-flop circuit 37. The output of flip-flop 37 thus provides an indication as to whether the program information represented by the demodulated output signal of record/playback unit MA represents audio or video. The flip-flop circuit 37 is reset in response to each head step signal generated by the circuit 50.

VIDEO CHANGE SIGNAL DETECTOR CIRCUIT 40

The demodulated output signal from record/playback amplifier AA which corresponds to audio information from the auxiliary audio track A, is supplied to both a DC restorer circuit 42 of circuit 40 as well as to an audio decompressor circuit AC. Suitable circuitry for implementing the operation of the audio decompressor circuit AC is described in detail in the above-identified U.S. Pat. No. 3,789,137 which is incorporated herein by reference. The audio decompressor circuit AC functions to convert the time compressed audio segments or audio lines into real time audio information for reproduction on conventional audio apparatus. In the embodiment of FIG. 1, the audio decompressor circuit AC further provides an indication of the end of an audio track as an input signal to the VIDEO AND AUDIO TRANSFER AND PROGRAM HEAD STEPPING CONTROL CIRCUIT 50.

The DC restorer circuit 42 adjusts the DC level of the demodulated input signal representing the audio program information and provides an input signal at a level to assure that the video change signal Q is detected by the AND gate 44. If the demodulated information corresponds to a segment of time compressed audio information including a video change signal Q, the audio line would correspond to the waveform A of FIG. 5. The time compressed audio information, which is developed in accordance with the teachings of the above-identified U.S. Patent, is of video bandwidth and comprises the active portion of a conventional television line. The video change signal Q is typically one microsecond in duration and precedes the compressed audio portion of the audio line as indicated in waveform A of FIG. 5. The presence of a horizontal pulse HP at the input of delay monostable circuit 41 causes the delay monostable circuit 41 to trigger pulse monostable circuit 43 which in turn provides a second input to the AND gate 44. The pulse representations of waveforms B, C and D of FIG. 5 illustrate the relationship of the horizontal pulse HP, the output pulse of the delay monostable circuit 41 and the pulse output of pulse monostable circuit 43 with respect to the audio line waveform A of FIG. 5. It is apparent from FIG. 5, that the output pulse from the pulse monostable circuit 43 is timed to overlap the front edge of the video change signal Q if such a signal is present in the audio line waveform. Consequently, when a video change signal Q is present in the audio line, an output pulse is gated through AND gate 44 to set flip-flop circuit 45, the output of which indicates that a video change signal Q has been detected.

While the video change signal Q is typically illustrated in waveform A of FIG. 5 as a pulse inserted at a position immediately preceding the compressed audio portion of an audio line, the video change signal Q may also take the form of a pulse code modulated (PCM) signal located in the vertical blanking intervals of the recorded audio or the recorded video.

VIDEO AND AUDIO TRANSFER AND PROGRAM HEAD STEP CONTROL CIRCUIT 50

The actuation of playback mode switch PS initiates an output signal from monostable circuit 51 which is supplied as an input to OR gate 52. A second input to OR gate 52 is a signal indicative of the end of an audio track developed by the audio decompressor circuit AC. When either input is provided to the OR gate 52, an output signal from the OR gate 52 sets flip-flop circuit 53. The output of the flip-flop circuit 53 is supplied as an input to AND gate 54 and AND gate 61. If an input signal from VIDEO/AUDIO SIGNAL DISCRIMINATOR CIRCUIT 30 to AND gate 54 indicates that the moving head MH is on a video track of disc D, then the next frame pulse FP developed by FRAME AND HORIZONTAL PULSE GENERATOR CIRCUIT 20 is gated through AND gate 54 to OR gate 64 which supplies a head step output signal to head step motor HM and a reset signal to flip-flop circuit 37 of circuit 30. This process continues with each frame pulse FP causing head step signals to advance the moving head MH until the output of the VIDEO/AUDIO SIGNAL DISCRIMINATOR CIRCUIT 30 indicates that the moving head MH is on an audio track. Inasmuch as the output signals from the VIDEO/AUDIO SIGNAL DISCRIMINATOR CIRCUIT 30 are further supplied through inverter circuit 55 to AND gate 61, once the moving head MH is located on an audio track, the frame pulses FP are gated through AND gate 61 to trigger monostable circuits 62 and 63. The output of monostable circuit 62 is a one frame period (1/30th of a second) audio erase signal which is supplied as an input signal to the audio record/playback amplifier AA. The output signal from the monostable circuit 63 is an audio transfer gate signal of a duration corresponding to two frame periods (2/30th of a second) which is supplied to the audio transfer gate input of the audio record/playback amplifier AA to maintain the record/playback amplifier AA in the record mode for two frame periods. As a consequence, during the first frame period of the output pulse from monostable circuit 63, the auxiliary audio track A is erased, while during the second frame period of the output pulse from monostable circuit 63, the limited output signal from the moving head record/playback amplifier MA is recorded on the auxiliary audio track A. It is noted with reference to FIG. 2, that when switch 18 is in position 2 for recording, that the input information supplied to the audio record/playback amplifier AA for recording is passed through demodulator circuit 16 and demodulated simultaneously with the recording. This provides a continuous signal for demodulation when a new audio track is recorded at the completion of a previous audio track.

In order to prevent loss of audio during the 2/30th seconds required to erase and record a new audio frame on the audio track A by audio head AH, the signal from the moving head MH is supplied to the demodulator circuit 16 of circuit AA during the recording period. Thus the first 2/30th seconds of time compressed audio are decompressed directly from the signal from the moving head MH and the remaining transferred audio is decompressed from the audio recorded on the auxiliary audio track A.

Similarly, the initial 2/30th seconds of transferred video is transferred directly from the moving head MH through the corresponding demodulator circuit 16 to a monitor to award loss of monitor sync during transfer of the video to the auxiliary video track V. At the end of the audio transfer gate pulse from the monostable circuit 63, pulse monostable circuit 64 is triggered to produce a pulse which is supplied to OR gate 65 to produce a head step signal and is further supplied to reset flip-flop circuit 53. Flip-flop circuit 53 then remains reset until the end of an audio track playback at which time the audio decompressor circuit AC initiates an end of audio track signal which passes through OR gate 52 and sets flip-flop circuit 53 to repeat the process of stepping to an audio track if the moving head MH is not already on an audio track, and then transferring the recorded audio signals to the auxiliary audio track A for reproduction.

During the playback of any particular audio track, a video change signal Q can be detected by the VIDEO CHANGE SIGNAL DETECTOR CIRCUIT 40. When this occurs, an output signal indicative of a video change signal from circuit 40 is supplied as an input signal to AND gate 56. If the VIDEO/AUDIO SIGNAL DISCRIMINATOR CIRCUIT 30 indicates that the moving head MH is on a video track, as it should be since the moving head was stepped after the previous audio transfer, then AND gate 56 passes the next frame pulse FP to trigger the monostable circuit 57. The output of monostable circuit 57 triggers monostable circuits 58 and 59 to provide a one frame duration video erase signal and a two frame duration video transfer gate signal to the video record/playback amplifier VA. These signals function to erase the video information present on the auxiliary video track V and to record the video information transferred by the moving head MH for display. At the conclusion of the video transfer gate pulse from the monostable circuit 59, the pulse monostable circuit 60 is triggered and supplies an output pulse to OR gate 65 to develop a head step signal to once again advance the moving head MH. The moving head MH will be advanced to the next video track if additional video changes are to accompany the transferred audio information or, if there are no further video changes required by the transferred audio information, the moving head will be stepped to the next track which will be an audio track.

In summary, the audio/video playback system of FIG. 1 functions as follows. An audio frame, comprised of a plurality of time compressed audio segments or audio lines, is transferred by the moving head MH through the record/playback amplifiers MA and AA to be recorded on the auxiliary audio track A. When the audio transfer is completed, the pulse monostable circuit 64 steps the moving head MH forward to the next track. If the next track is a video track, the moving head MH will remain on that track until a video change signal Q is detected by circuit 40. When a video change signal Q is detected, the video signal present on the track will be transferred by the moving head MH to the video head VH for recording the video signal on the auxiliary video track V. At the completion of the video transfer, the moving head is again stepped forward onto the next track of the disc D. Since the moving head is stepped after each transfer of recorded information, the moving head is positioned to transfer the next audio or video signal information required. However, if as the result of noise in the signal or other erroneous conditions, a mistracking of the moving head MH occurs such that when the next audio transfer is required, the moving head MH happens to be located on a video track, then the arrangement of supplying the output signal from the VIDEO/AUDIO SIGNAL DISCRIMINATOR CIRCUIT 32 to AND gate 54 causes head step signals to be generated until the moving head MH is located on the next audio track. This permits the system to resynchronize so that proper video is displayed with the associated audio.

As discussed earlier, the disclosed invention may be practiced using several variations in the storage medium and record/playback heads. A typical variation to the implementation illustrated in FIG. 1 is schematically illustrated in FIG. 6. The storage medium D', which may be either magnetic or optical, consists of a separate audio section A' and a separate video section V' with moving audio head AH' associated with the audio section A' and a moving video head AH' associated with the video section V'. The moving video head VH' is synchronized with the moving audio head AH' by the video change signal detector circuit 40' which responds to the presence of a video change signal present in the reproduced information from the moving audio head AH' by advancing the moving video head VH' for reproduction of the corresponding video information from the video section V'. In this implementation, the reproduced audio and video information is not transferred to auxiliary storage sections or tracks, but rather is presented directly for processing and playback.

I claim:

1. A method for reproducing the audio frames or fields and the video frames or fields of an audio/video program from sequential access storage media wherein the audio frames consist of audio lines of time compressed audio information in television line format and video change signals indicating the time for displaying the video frames corresponding to the audio, comprising the steps of:
   reproducing audio frames consisting of audio lines of time compressed audio information in television line format including video change signals indicating the time for displaying the video frames corresponding to the audio,
   detecting the presence of the video change signals in each reproduced audio frame, and
   reproducing the video frames corresponding to each reproduced audio frame in response to the detected video change signals.

2. Apparatus for the reproduction of the audio frames or fields and the video frames or fields of an audio/video program from the tracks of a sequential access storage medium wherein the audio frames consist of audio lines of time compressed audio information in a television line format, each audio frame recorded on a track and including one or more video change signals indicating the time for displaying associated video frames, each such audio track followed by a number of video tracks of associated video frames, the number of said video tracks corresponding to the number of video change signals present in the recorded audio track, comprising,
   an auxiliary audio storage device having an audio record/playback head associated therewith,
   an auxiliary video storage device having a video record/playback head associated therewith,
   a moving playback head associated with said audio/video program on said sequential access storage medium,
   first circuit means for transferring the audio frames reproduced by said moving playback head to said record/playback head associated with said auxiliary audio storage device for recording said audio frames on said auxiliary audio storage device,
   second circuit means for reproducing said audio frames from said auxiliary audio storage device,
   third circuit means for detecting video change signals present in the audio frames reproduced from said auxiliary audio storage device,
   fourth circuit means responding to said video change signal detected by said third circuit means by advancing said moving playback head for reproducing corresponding video frames, and
   fifth circuit means for transferring said reproduced video frames to said record/playback head associated with said auxiliary video storage device for recording said video frames on said auxiliary video storage device.

3. A method for reproducing the audio frames or fields and the video frames or fields of an audio/video program from sequential access storage media wherein the audio frames consist of audio lines of time compressed audio information in television line format and video change signals indicating the time for displaying the video frames corresponding to the audio, comprising the steps of,
   sequentially transferring the audio frames to an auxiliary audio storage medium, reproducing the audio frames transferred to the auxiliary audio storage medium, detecting the video change signals present in the audio frames reproduced from said auxiliary audio storage medium, and transferring the associated video frames from the sequential storage medium to an auxiliary video storage medium in response to the detection of the video change signals present in the audio frames reproduced from said auxiliary audio storage medium.

4. A method for reproducing the audio frames or fields and the video frames or fields of an audio/video program from sequential access storage media wherein the audio frames consist of audio lines of time compressed audio information in television line format and video change signals indicating the time for displaying the video frames corresponding to the audio, comprising the steps of,
   sequentially transferring the audio frames to an auxiliary audio storage medium, reproducing an initial portion of the audio information from the audio frame immediately prior to transferring the audio frame to said auxiliary audio storage medium, reproducing the audio frames transferred to the auxiliary audio storage medium, detecting the video change signals present in the audio frames reproduced from said auxiliary audio storage medium, and transferring the associated video frames from the sequential storage medium to an auxiliary video storage medium in response to the detection of the video changed signals present in the audio frames reproduced from said auxiliary audio storage medium.

5. A method as claimed in claim 4 including the step of directly displaying the video information from a video frame immediately prior to transferring said video frame to said auxiliary video storage medium.

6. Apparatus for reproducing the audio frames or fields and the video frames or fields of an audio/video program from sequential access storage media wherein the audio frames consist of audio lines of time compressed audio information in television line format and video change signals indicating the time for displaying the video frames corresponding to the audio, comprising, first means for reproducing audio frames consisting of audio lines of time compressed audio information in television line format including video change signals recorded therewith indicating the time for displaying video frames corresponding to the audio, second means for detecting the presence of the video change signals present in each reproduced audio frame, and third means for reproducing the video frames corresponding to each reproduced audio frame in response to the detected video change signals.

7. Apparatus as claimed in claim 6 wherein said sequential access storage media consists of a storage disc, said audio frames and video frames being recorded on predetermined portions of said storage disc, said first means including a moving audio playback head associated with said audio frames and said third means including a moving video playback head associated with said video frames, said second means including circuit means responding to video change signals present in the audio frames reproduced by said moving audio playback head of said first means by positioning said moving video playback head of said third means for reproducing the corresponding video frames.

8. Apparatus for reproducing the audio frames or fields and the video frames or fields of an audio/video program from a sequential access storage medium wherein the audio frames consist of audio lines of time compressed audio information in television line format and video change signals indicating the time for displaying the video frames corresponding to the audio, comprising, an auxiliary audio storage device having an audio record/playback head associated therewith, an auxiliary video storage device having a video record/playback head associated therewith, a moving playback head associated with said audio/video program on said sequential access storage medium, first circuit means for transferring the audio frames reproduced by said moving playback head to said record/playback head associated with said auxiliary audio storage device for recording said audio frames on said auxiliary audio storage device, second circuit means for reproducing said audio frames from said auxiliary audio storage device, third circuit means for detecting video change signals present in the audio frames reproduced from said auxiliary audio storage device, fourth circuit means responding to said video change signal detected by said third circuit means by advancing said moving playback head for reproducing corresponding video frames, and fifth circuit means for transferring said reproduced video frames to said record/playback head associated with said auxiliary video storage device for recording said video frames on said auxiliary video storage device.

9. Apparatus as claimed in claim 8 further including, sixth circuit means connected to said record/playback head associated with said auxiliary audio storage device for converting the time compressed audio information present on said auxiliary audio storage device into audio information for presentation to a listener, and seventh circuit means connected to said record/playback head associated with said auxiliary video storage device for displaying the video information stored in said auxiliary video storage device.

* * * * *